Figure 1:
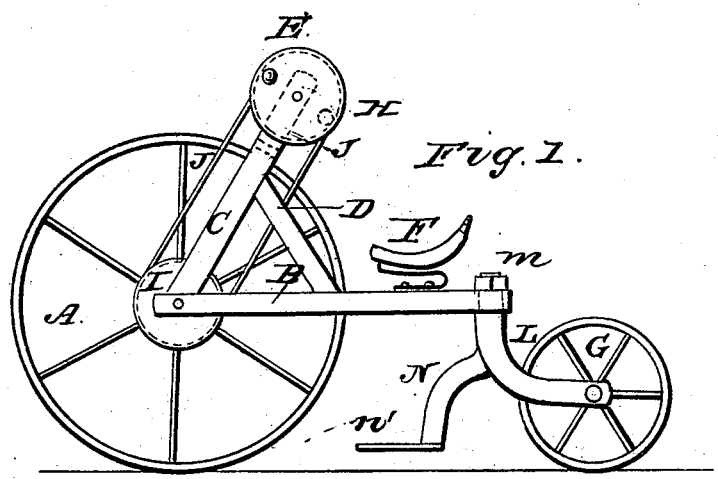
Figure 2:
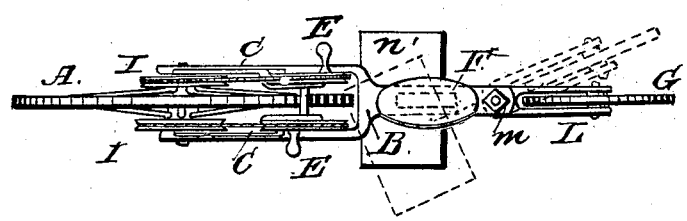

RATHMANN & JOHNSON.
Velocipede.

No. 90,687.

Patented June 1, 1869.

Witnesses
Wm Beadle
B. H. Muehle

Inventor
Henry Rathmann
Geo. H. Johnson

United States Patent Office.

HENRY RATHMANN AND GEORGE H. JOHNSON, OF BUFFALO, NEW YORK.

*Letters Patent No. 90,687, dated June 1, 1869.*

---

IMPROVEMENT IN VELOCIPEDES.

---

The Schedule referred to in these Letters Patent and making part of the same.

---

*To all whom it may concern:*

Be it known that we, HENRY RATHMANN and GEORGE H. JOHNSON, of the city of Buffalo, in the county of Erie, and State of New York, have invented a certain new and improved Velocipede; and we do hereby declare that the following is a full, clear, and exact description thereof, reference being had to the accompanying drawings, making a part of this specification, in which—

Figure I is a side elevation of our improved velocipede, and

Figure II is a top plan view of the same.

The nature of this invention consists—

First, in the construction of a triangular frame, the apex of one of its angles forming a bearing for the driving-wheel, in combination with two or more grooved pulleys, connected by one or more endless cords or chains, these parts being so arranged upon said frame that the driver, seated behind the driving-wheel, may grasp with his hands one set of wheels, or pulleys, and by revolving them, communicate a rotary motion to the axle of the driving-wheel, to which the other set of wheels is attached, and by such manual exertion upon his part propel the vehicle.

Second, in a curved fork, revolving upon a vertical pivot, or spindle, at or near the rear end of the frame of the velocipede, and in the rear of the driving-wheel, the curved fork holding a guide-wheel, upon which the end of the frame is supported, and being provided with a tiller, or treadle-lever, by means of which the vehicle may be steered, or guided in any desired direction.

Letters of like name and kind refer to like parts in each of the figures.

A represents the driving-wheel of our improved velocipede, which is fast to its axle, and has suitable bearings upon the frame B.

This frame is of peculiar construction. It consists of a bifurcated bar, extending horizontally, or nearly so, from the axle of the driving-wheel to the rear, where it is supported upon the guide-wheel G, hereinafter described.

Upon this main portion of the frame, the seat F is placed, as near to the driving-wheel as may be convenient.

Standards C C are erected upon this horizontal bar, at its forward, or forked end, where the bearings of the driving-wheel are formed, one upon each side of the wheel.

These are placed at an angle, which brings their upper ends within reach of the driver, as he sits upon his seat, and are supported in this position by one or more braces, D.

Upon the upper end of the standards C, a counter-shaft is placed parallel to the axle of the driving-wheel A.

Two pulleys, H, are keyed to the counter-shaft, and two other pulleys, I, to the axle of the driving-wheel. Each pair is connected with the other pair by means of the endless cords, or chains J.

There may be either one set of pulleys, H I, connected by a cord, J, upon one side of the wheel A and frame C, or there may be one set upon each side of the wheel and frame, as may be most practicable and convenient.

Either one or both ends of the counter-shaft are provided with winch-handles E, which are turned by the driver, for the purpose of communicating a rotary motion from the counter-shaft to the axle of the driving-wheel, and thus the vehicle is propelled.

The sizes of the pulleys H and I may be so proportioned that one revolution of the cranks E will cause the driving-wheel A to revolve a greater number of times, and hence the velocipede can be propelled at a very great speed with but a slow movement of the arms of the driver, although greater force must be applied in proportion; but as it is very evident that a person can exert a greater amount of power with his arms and hands than with his feet, this mode of propelling a velocipede must recommend itself on this particular account.

Furthermore, the driver is enabled to balance himself and his vehicle with greater ease, by taking and retaining a firm hold upon the cranks E.

G represents a guide-wheel, which supports the rear end of the frame B C D, and is used for steering our improved velocipede.

This wheel is connected to a bifurcated bar, L, which has a vertical spindle, m, at its upper end, and from that point to the axle of the guide-wheel is of a quarter circular shape, or curved in such manner that the axle of the wheel G is placed at a distance from a line drawn through the axis of the spindle m.

The main object of this peculiar construction of the bar L will be easily understood upon examination of the drawings.

The spindle m revolves within a tubular bearing formed at the rear end of the frame B C D, and a tiller, N, is connected to the bar L, projecting in a direction opposite to that in which the bar L is curved.

A foot-treadle, n', at the forward end of the tiller N, is within convenient reach of the driver's feet, so that he may, at the proper time, turn the vehicle from its straight course, by the action of his lower extremities; and as soon as he has guided the front wheel and frame into the course or direction he wishes to continue, he releases the tiller, and the guide-wheel will, of its own accord, return to its former position in line with the driving-wheel A.

Hence, so long as the driver is desirous of travelling straight ahead, it is unnecessary for him to place his feet upon the treadle, and all his attention may be directed to the propulsion of the vehicle, and to his retaining a proper balance upon the same.

What we claim as our invention, and desire to secure by Letters Patent, is—

In a two-wheel velocipede, the forwardly-projecting tiller N, cast or formed with the bifurcated bar L, arranged beneath the seat, and provided with the foot-rest and steering-plate $n'$, in combination with the frame B, carrying frame C and pulleys H I, and having said bar L jointed to its rear, through the medium of spindle $m$, as described.

HENRY RATHMANN.
GEO. H. JOHNSON.

Witnesses:
WM. BEADLE,
B. H. MUEHLE.